United States Patent [19]

Konishi

[11] Patent Number: 5,172,372
[45] Date of Patent: Dec. 15, 1992

[54] METHOD AND APPARATUS FOR DETERMINING TRANSMISSION LINE FOR MESSAGE TRANSMISSION AND RECEPTION IN NETWORK SYSTEM

[75] Inventor: Kuniyoshi Konishi, Tokyo, Japan

[73] Assignee: Kabushiki Kaisha Toshiba, Kawasaki, Japan

[21] Appl. No.: 710,776

[22] Filed: Jun. 5, 1991

[30] Foreign Application Priority Data

Jun. 5, 1990 [JP] Japan .................................. 2-145403

[51] Int. Cl.[5] ...................... H04L 12/46; H04L 12/66
[52] U.S. Cl. .................................. 370/85.13; 370/94.3
[58] Field of Search ............... 370/85.13, 85.14, 85.12, 370/85.1, 85.15, 85.9, 94.3; 340/825.05

[56] References Cited

U.S. PATENT DOCUMENTS

| | | | |
|---|---|---|---|
| Re. 33,426 | 11/1990 | Sugimoto et al. | 370/85.14 |
| 4,972,409 | 11/1990 | Backes | 370/85.14 |
| 5,027,350 | 6/1991 | Marshall | 370/85.13 |
| 5,060,228 | 10/1991 | Tsutsui et al. | 370/85.13 |

FOREIGN PATENT DOCUMENTS 0397188 11/1990 European Pat. Off. ......... 370/85.14

*Primary Examiner*—Douglas W. Olms
*Assistant Examiner*—Min Jung
*Attorney, Agent, or Firm*—Oblon, Spivak, McClelland, Maier & Neustadt

[57] ABSTRACT

When the first message from a station is received by a LAN interface in a LAN connector unit, a source station address and a bridge port address are registered in an address translation table, and a flag T2 is set. This message is transmitted to the respective interfaces in the LAN connector unit by broadcast. Upon receiving this message, a flag T4 is set in the interface, and flags T1 are set in the other interfaces. When a WAN interface in another LAN connector unit receives the first message, a flag T2 is set. This message is transmitted from the WAN interface to the respective interfaces in the LAN connector unit by broadcast. The WAN interface is determined as an input/output interface associated with this message, and a flag T4 is set. A flag T1 is set in other interfaces. When the WAN interface receives a delayed message, since the flag T1 is already set therein, this interface is determined not to be an input/output interface for this message. A flag T3 is set in this interface.

9 Claims, 12 Drawing Sheets

| ENTRY NUMBER | V | T₁ | T₂ | T₃ | T₄ | STATION ADDRESS | BRIDGE PORT ADDRESS | TIMER VALUE |
|---|---|---|---|---|---|---|---|---|
| 0 | 1 | 1 | 0 | 0 | 0 | 00000000001 | 00000000002 | 0001 |
| 1 | 1 | 0 | 1 | 0 | 0 | 00000000002 | 00000000005 | 9991 |
| 2 | 1 | 0 | 0 | 0 | 0 | 00000000003 | 00000000007 | 0882 |
| 3 | 1 | 0 | 0 | 0 | 1 | 00000000004 | 00000000001 | 0071 |
| 4 | 1 | 1 | 0 | 0 | 0 | 00000000005 | 00000000004 | 0061 |
| 5 | 1 | 0 | 1 | 0 | 0 | 00000000006 | 00000000003 | 5432 |
| 6 | 1 | 0 | 0 | 1 | 0 | 00000000007 | 00000000005 | 0002 |
| 7 | 1 | 0 | 0 | 0 | 1 | 00000000008 | 00000000002 | 0004 |

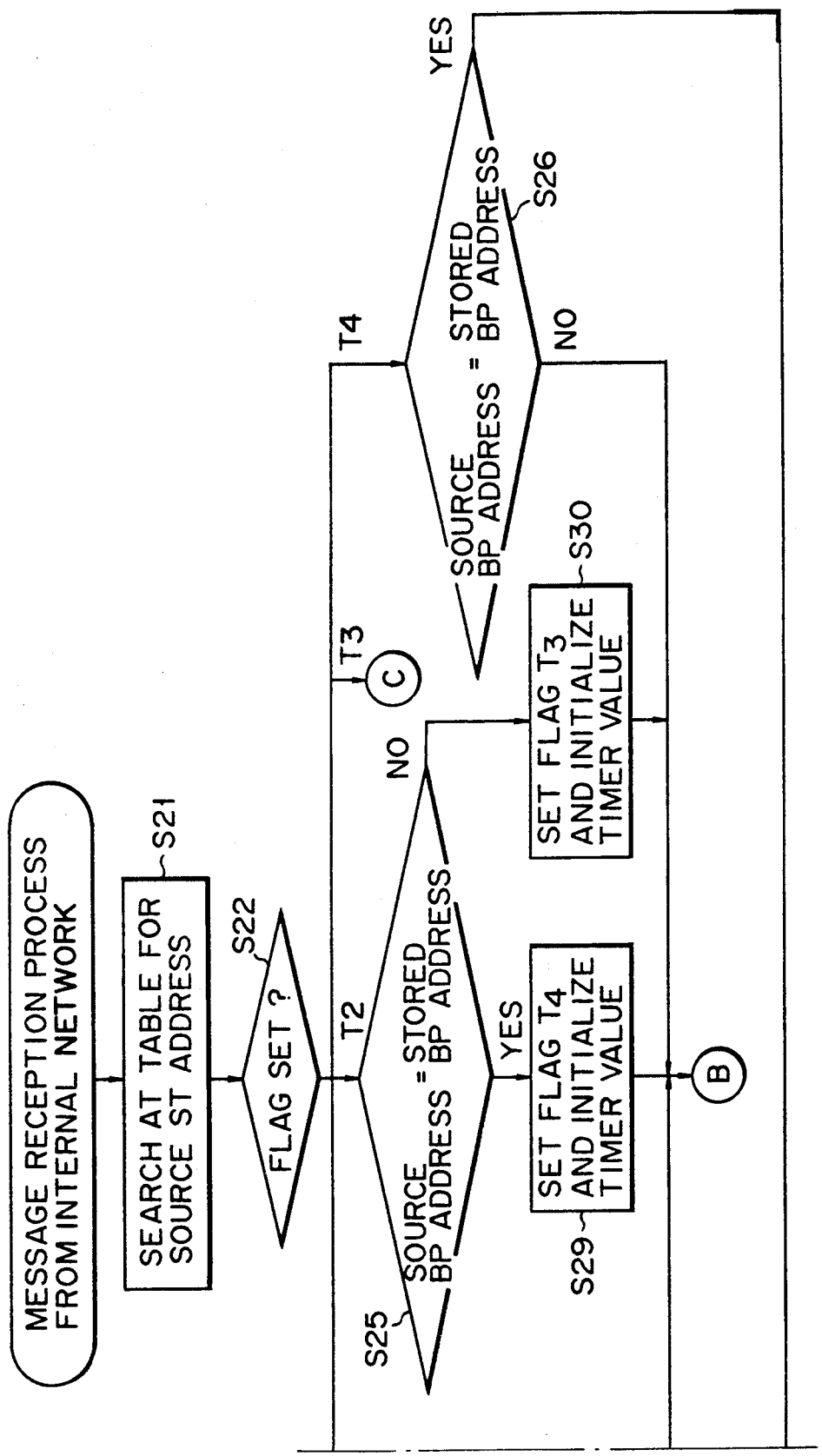
FIG. 9A-II

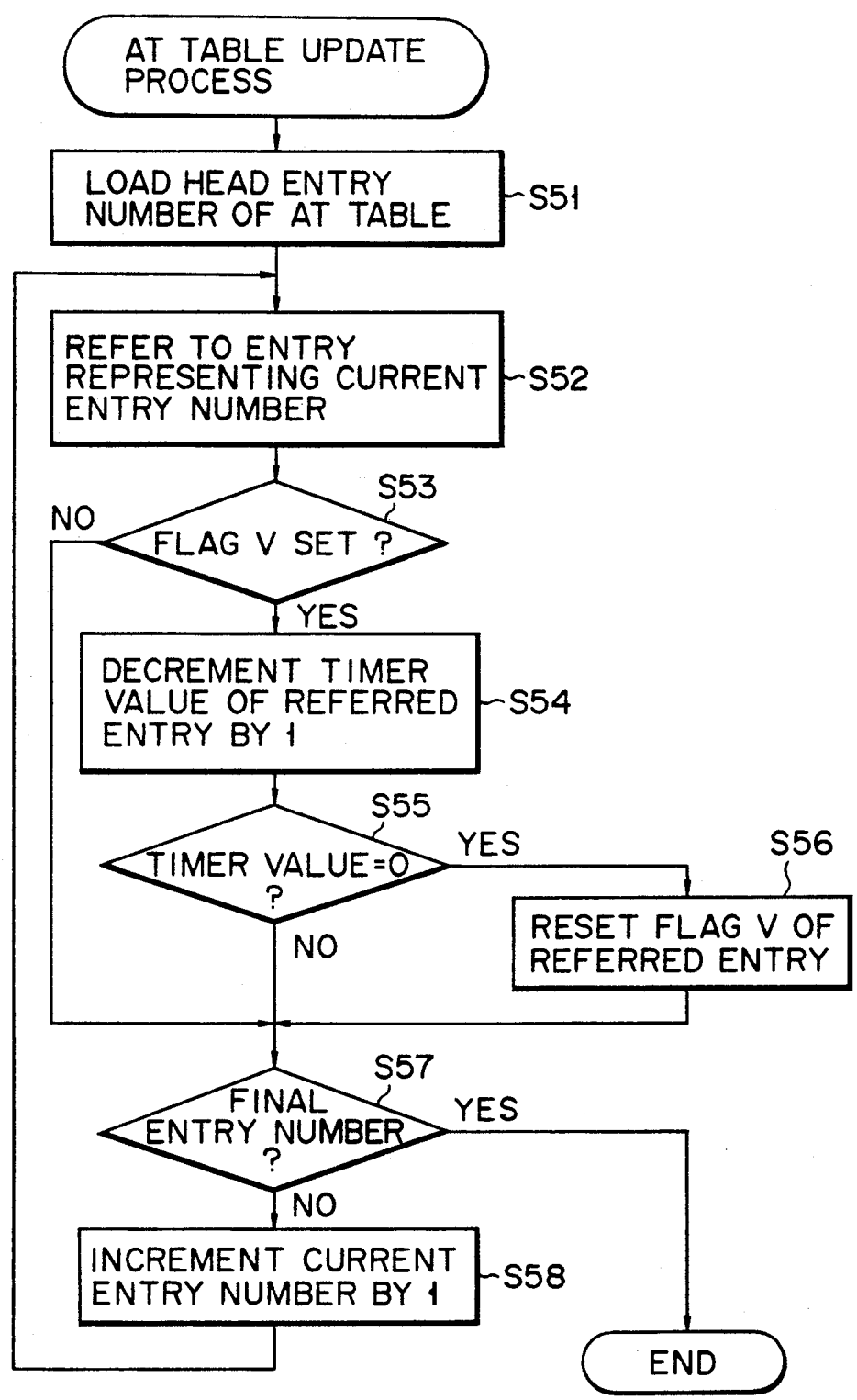
F I G. 10

METHOD AND APPARATUS FOR DETERMINING TRANSMISSION LINE FOR MESSAGE TRANSMISSION AND RECEPTION IN NETWORK SYSTEM

BACKGROUND OF THE INVENTION

1. Field of the Invention

The present invention relates to a method and apparatus for determining a transmission line for message transmission and reception in a network system.

2. Description of the Related Art

In a network wherein a plurality of LANs (Local Area Networks) are connected to each other through a plurality of WANs (Wide Area Networks) by a plurality of LAN connector units, a plurality of transmission lines capable of transmitting a message from a station of one LAN to a station of another LAN are generally available. One of the available transmission lines must therefore be determined.

A transmission line to be determined should not have any failure interval and must have a minimum load in its use as determination conditions. When a transmission line which satisfies these two determination conditions is selected, complicated processing is required. A special network monitor unit must be arranged independently of LAN connector units. For this reason, the system configuration becomes complicated, thus resulting in an expensive network system.

In order to transmit and receive a message between stations through a predetermined transmission line, an address (station address) of a station and an address (bridge port address) of a LAN (WAN) interface in a LAN connector unit indirectly connected to this station and constituting part of this transmission line must be paired. This address pair are generally registered in an address translation (AT) table by a hash method or the like. When a message is transmitted from station to station by broadcast, or when its response is performed, the address pair are automatically updated.

SUMMARY OF THE INVENTION

It is an object of the present invention to provide a method and apparatus for easily and automatically selecting an optimal transmission line in message transmission and reception between stations.

According to the present invention, in each interface of a LAN connector unit, when the first message concerning a source station and a destination station from a WAN or LAN is received, a source station address and a self-address (bridge port address) of the interface are registered in a desired entry of an address translation table, and a flag T2 is set in the determined entry. The received message is transmitted to an internal network of the LAN connector unit by broadcast, and a broadcast message on the internal network is received by the respective interfaces within the LAN connector unit.

Upon receiving the broadcast message, in each interface, a flag T4 is set in a desired entry of the address translation table associated with the source station address, and the received message is aborted.

To the contrary, in other interfaces, since this message is the first message associated with the source station address, the source station address and the source bridge port address are registered in a desired entry of the address translation table, and a flag T1 is set in the desired entry. The received message is transmitted to the WAN or LAN.

In the WAN interface of the LAN connector unit, since different message transmission lines are used, differences occur in arrival times even if messages having the same contents are transmitted. Upon receiving the first message in the interface, the source station address and the bridge port address of the interface are registered in a desired entry of the address translation table, and the flag T2 is set in the desired entry. The received message is transmitted from this interface to the respective interfaces of the LAN connector unit by the broadcast. If this broadcast message is received by each interface, the interface which transmitted this message is determined to be an input/output interface associated with this message. In this case, a flag set in a desired entry of the address translation table is changed from the flag T2 to the flag T4. In other interfaces, in the desired entry of the address translation table, the flag T1 is set, and the message is transmitted to the WAN or LAN.

In the WAN interface, when a message is delayed and received, since the flag T1 is set in the desired entry of the address translation table associated with the source station at the reception of the first message, the currently received message is determined to be a delayed message. In this case, this interface itself is determined not to be an input/output interface associated with this message, the flag T3 is set, and the received message is aborted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, an together with the general description given above and the detailed description of the preferred embodiments given below, serve to explain the principles of the invention.

FIGS. 9A-I, 9A-II, and 9B are flow charts showing message reception process from an internal network in each interface;

FIG. 10 is a flow chart of update process of the address translation table in each interface;

DETAILED DESCRIPTION OF THE PREFERRED EMBODIMENTS

Figure 1:
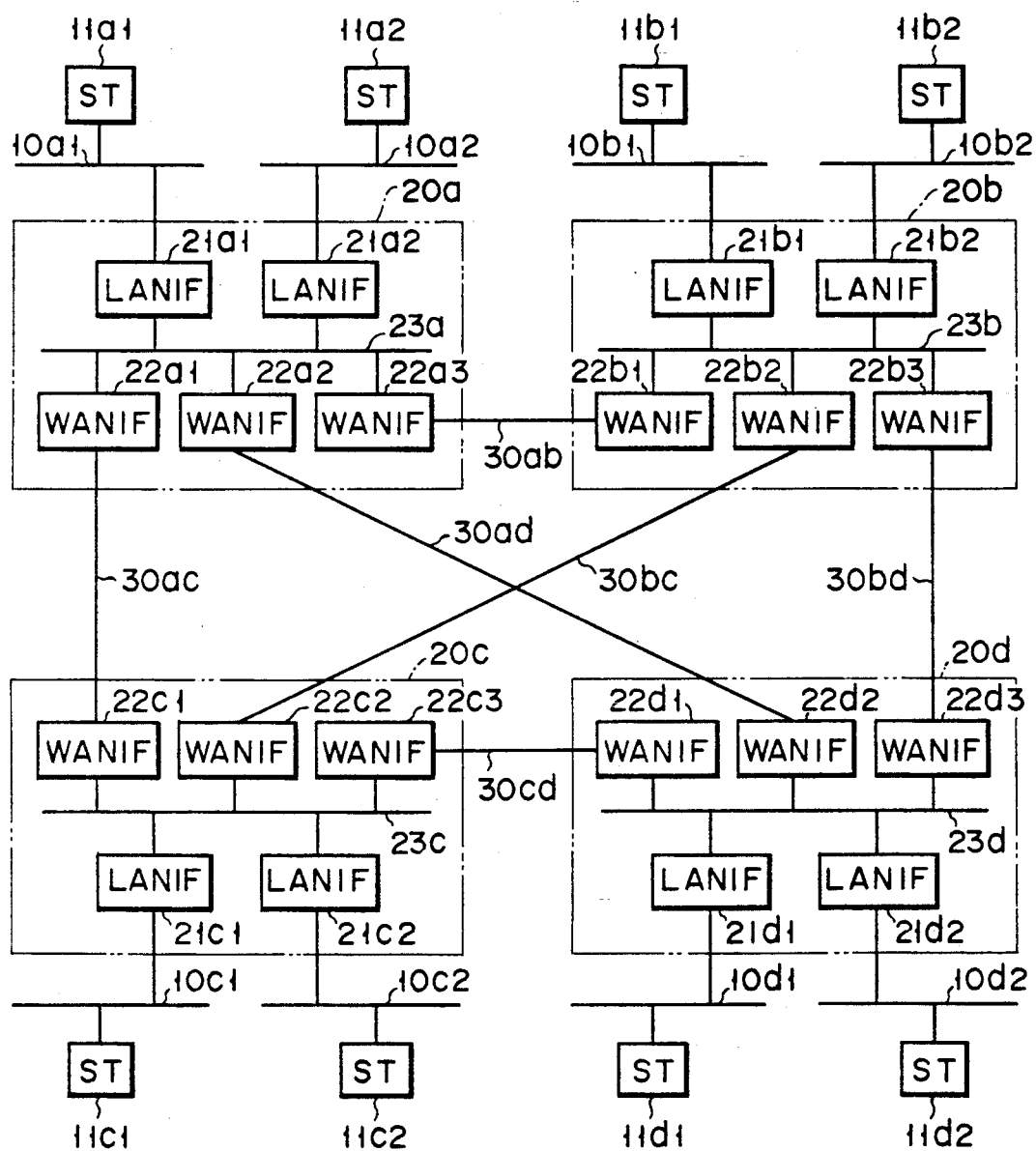
FIG. 1 is a block diagram showing a configuration of a network system according to the embodiment of the present invention.

FIG. 1 is a block diagram showing a configuration of a network system according to an embodiment of the present invention. Referring to FIG. 1, this network system comprises stations (STs) 11a1, 11a2, 11b1, 11b2, 11c1, 11c2, 11d1, and 11d2 connected to LANs (Local Area Networks) 10a1, 10a2, 10b1, 10b2, 10c1, 10c2, 10d1, and 10d2, LAN connector units 20a, 20b, 20c, and 20d, and WANs (Wide Area Networks) 30ab, 30ac, 30ad, 30bc, 30bd, and 30cd. The LANs 10a1, 10a2, 10b1, 10b2, 10c1, 10c2, 10d1, and 10d2 are connected to each other through the WANs 30ab, 30ac, 30ad, 30bc, 30bd, and 30cd by the LAN connector units 20a, 20b, 20c, and 20d.

The LAN connector unit 20a comprises LAN interfaces (LANIFs) 21a1 and 21a2, WAN interfaces (WANIFs) 22a1, 22a2, and 22a3, and an internal network 23a. The LANIFs 21a1 and 21a2 transmit and receive a message with the STs 11a1 and 11a2 connected to the LANs 10a1 and 10a2, respectively. The WANIFs 22a1, 22a2, and 22a3 transmit and receive a message with the WAN interfaces in the LAN connector units 20b, 20c, and 20d through the WANs 30ac, 30ad, and 30ab. The internal network 23a connects the interfaces 21a1, 21a2, 22a1, 22a2, and 22a3. Note that a small-scale internal network has a bus structure, and a large-scale network has a ring structure using optical fibers. An inherent bridge port (BP) address is assigned to each interface.

The LAN connector units 20b to 20d are arranged as in the LAN connector unit 20a described above. More specifically, the LAN connector unit 20b comprises LANIFs 21b1 and 21b2, WANIFs 22b1, 22b2, and 22b3, and an internal network 23b. The LAN connector unit 20c comprises LANIFs 21c1 and 21c2, WANIFs 22c1, 22c2, and 22c3, and an internal network 23c. The LAN connector unit 20d comprises LANIFs 21d1 and 21d2, WANIFs 22d1, 22d2, and 22d3, and an internal network 23d.

Figures 2, 3:
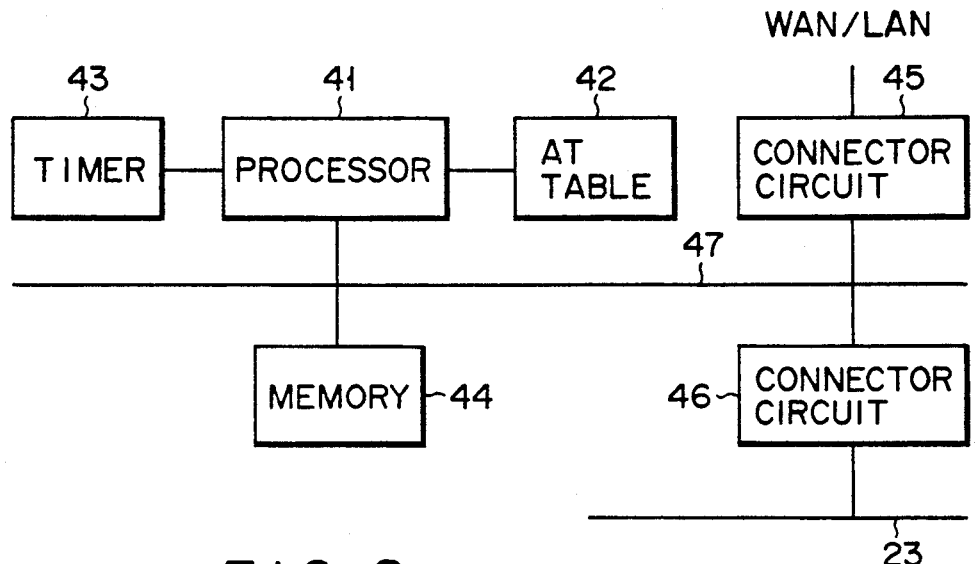
FIG. 2 is a block diagram showing an arrangement of an interface arranged in a LAN connector unit shown in FIG. 1.
FIG. 3 is a diagram showing the contents of an address translation table shown in FIG. 2.

FIG. 2 is a block diagram showing an arrangement of each interface of the LAN connector units 20a, 20b, 20c, and 20d shown in FIG. 1. As shown in FIG. 2, each interface comprises a processor 41, an address translation (AT) table 42, a timer 43, a memory 44, and connector circuits 45 and 46.

The processor 41 performs control of the respective components of the interface and address translation process as described later. The AT table 42 registers address translation information such as a station (ST) address and the corresponding bridge port (BP) address. The AT table 42 is accessed by only the processor 41. The timer 43 interrupts the processor 41 at predetermined intervals. Update process for the AT table 42 is performed by the processor 41 in accordance with an interrupt signal from the timer 43.

The memory 44 stores a message to be transmitted and received. The connector circuit 45 is used to perform message transmission and reception to the WAN (or LAN). The connector circuit 46 is used to perform message transmission and reception to the internal network 23. An internal bus 47 is connected to the processor 41, the memory 44, and the connector circuits 45 and 46.

FIG. 3 shows the contents of the AT table 42 shown in FIG. 2. As shown in FIG. 3, each entry in the AT table 42 has a station address of a destination or source station, a corresponding bridge port address, a timer value used to manage validity/invalidity of this address pair, and a plurality of flags. These flags are a flag V representing whether the content of the entry is valid, and flags T1, T2, T3, and T4. When the flag V is set, one of the flags T1 to T4 is set.

Figure 4:
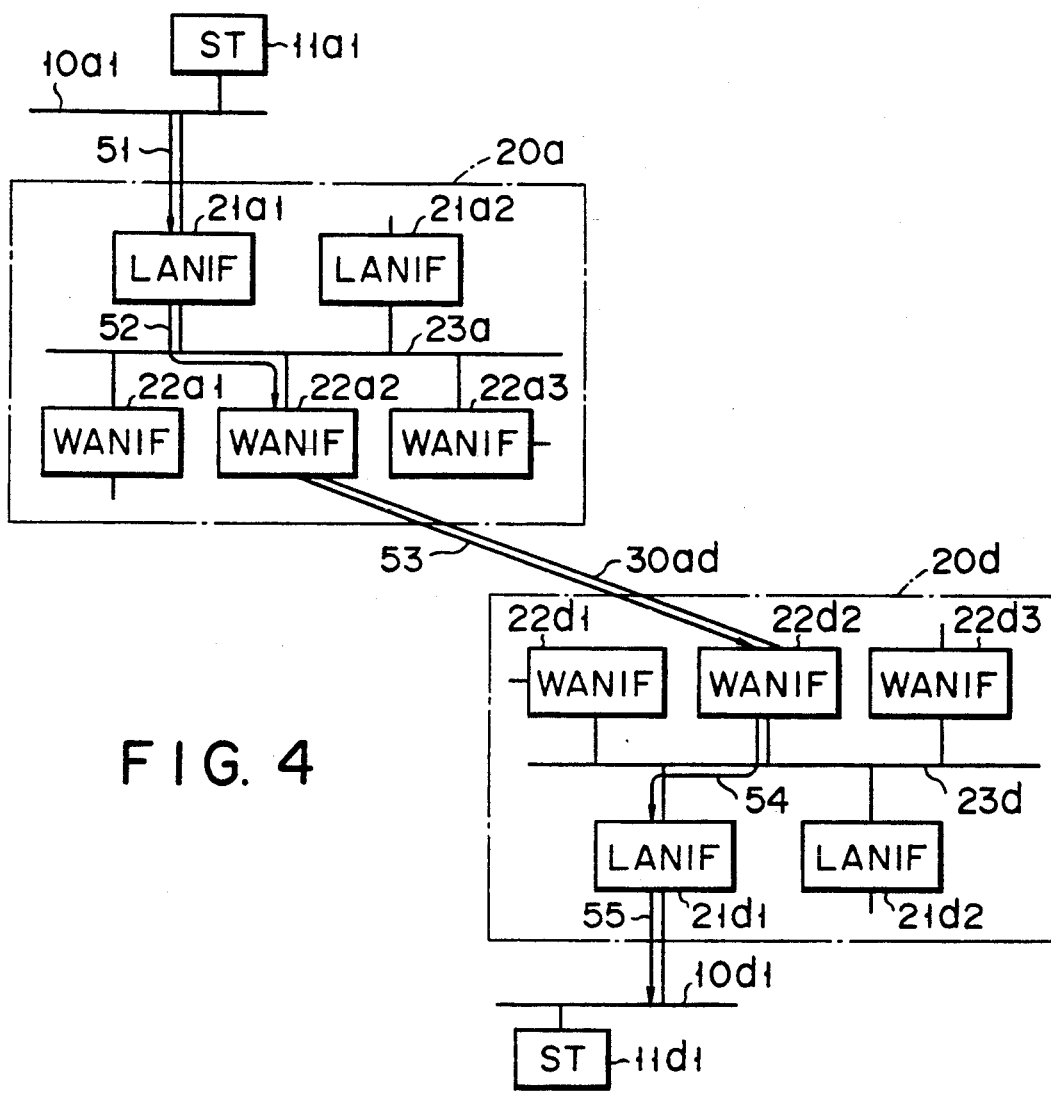
FIG. 4 is a view for explaining a flow of a message transmitted through a WAN.

FIG. 4 is a block diagram for explaining transmission of a message on an optimal transmission line from the station 11a1 on the LAN 10a1 in FIG. 1 to the station 11d1 on the LAN 10d1. Various transmission lines are available between the LAN connector unit 20a connected to the LAN 10a1 to the LAN connector unit 20d connected to the LAN 10d1. An optimal transmission line in FIG. 4 is a transmission line passing through the LANIF 21a1, the WANIF 22a2, the WAN 30ad, the WANIF 22d2, and the LANIF 21d1.

Figure 5:
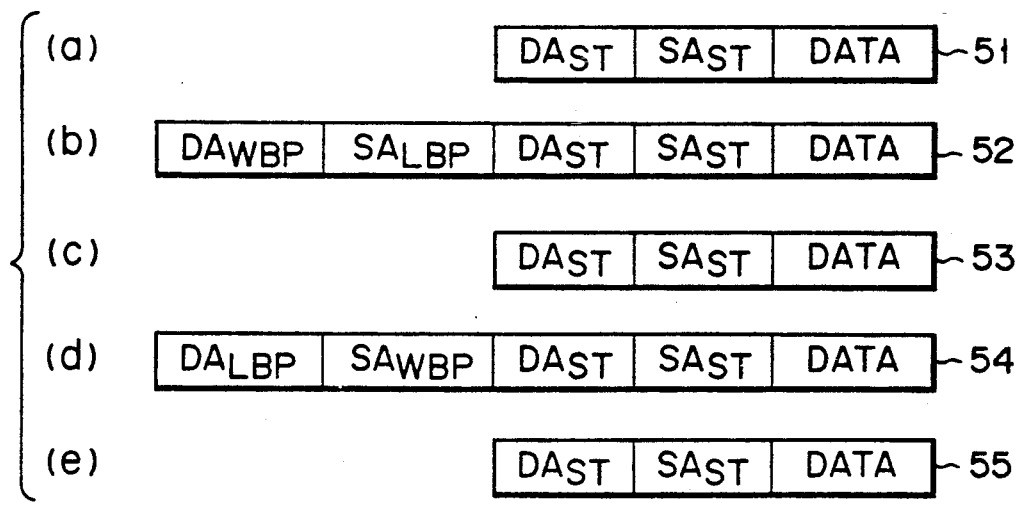
FIG. 5 is a view showing a format of a message in a transmission line in FIG. 4.

FIG. 5 is a view showing a format of a message on the transmission line shown in FIG. 4. Referring to FIG. 5, a message 51 transmitted from the ST 11a1 onto the LAN 10a1 has a destination station address $DA_{ST}$ representing an address of the destination station 11d1, a source station address $SA_{ST}$ representing an address of the source station 11a1, and data DATA representing the content of the message.

A message 52 transmitted from the LANIF 21a1 to the WANIF 22a2 has a destination bridge port address DA WBP representing a bridge port address of the destination WANIF 22d2 and a source bridge port address $SA_{LBP}$ representing a bridge port address of the source LANIF 21a1 in addition to the message 51.

A message 53 transmitted from the WANIF 22a2 to the WANIF 22d2 via the WAN 30ad is identical to the message 51.

A message 54 transmitted from the WANIF 22d2 to the LANIF 21d1 has a destination bridge port address $DA_{LBP}$ representing a bridge port address of the destination LANIF 21d1 and a source bridge port address $SA_{WBP}$ representing a bridge port address of the source WANIF 22d2 in addition to the message 53.

A message 55 transmitted from the LANIF 21d1 to the station 11d1 on the LAN 10d1 is identical to the message 51.

When information associated with an optimal transmission line from the ST 11a1 on the LAN 10a1 to the ST 11d1 on the LAN 10d1 is not obtained, the message having a format substantially the same as that shown in FIG. 5(b) is transmitted by broadcast from the LANIF 21a1 to all the interfaces 21a1, 21a2, 22a1, 22a2, and 22a3 in the LAN connector unit 20a. In this case, a destination bridge port address is a broadcast bridge port address.

Figure 6:
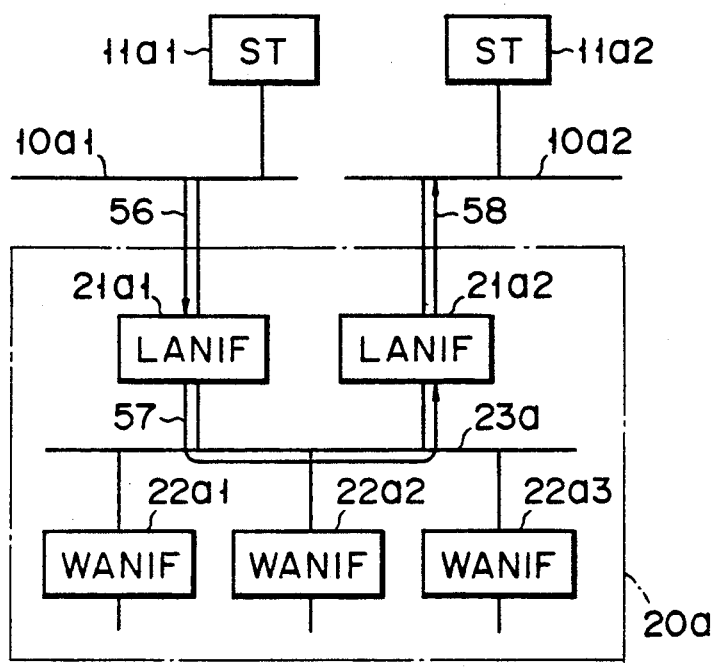
FIG. 6 is a view for explaining a flow of a message transmitted through a LAN connector unit.
Figure 7:
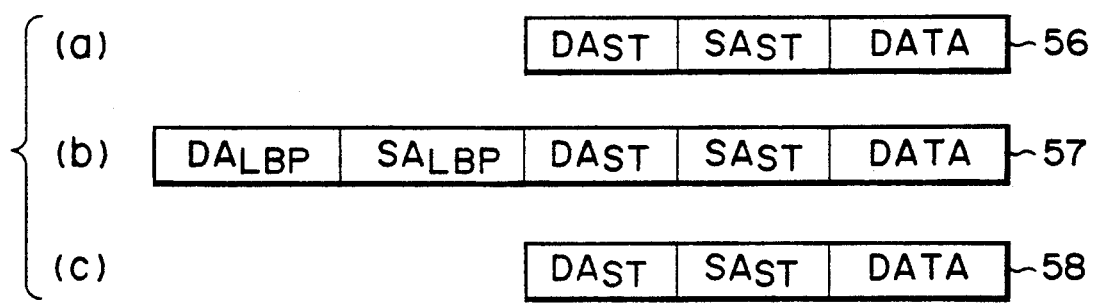
FIG. 7 is a format of a message in a transmission line shown in FIG. 6.

FIG. 6 is a view for explaining transmission of a message from the ST 11a1 on the LAN 10a1 in FIG. 1 to the ST 11a2 on the LAN 10a2. FIG. 7 is a view for explaining a format of the message on the transmission line shown in FIG. 6. Referring to FIG. 7, a message 56 transmitted from the ST 11a1 to the LAN 10a1 has a destination ST address $DA_{ST}$ representing an address of the destination ST 11a2, a source ST address $SA_{ST}$ representing an address of the source ST 11a1, and data DATA representing the contents of the message.

A message 57 transmitted from the LANIF 21a1 to the LANIF 21a2 has a destination ST address $DA_{LBP}$ representing a bridge port address of the destination LANIF 21a2 and a source ST address $SA_{LBP}$ representing a bridge port address of the source LANIF 21a1, in addition to the message 56.

A message 58 transmitted from the LANIF 21a2 to the LAN 10a2 is identical to the message 56.

Figure 8A:
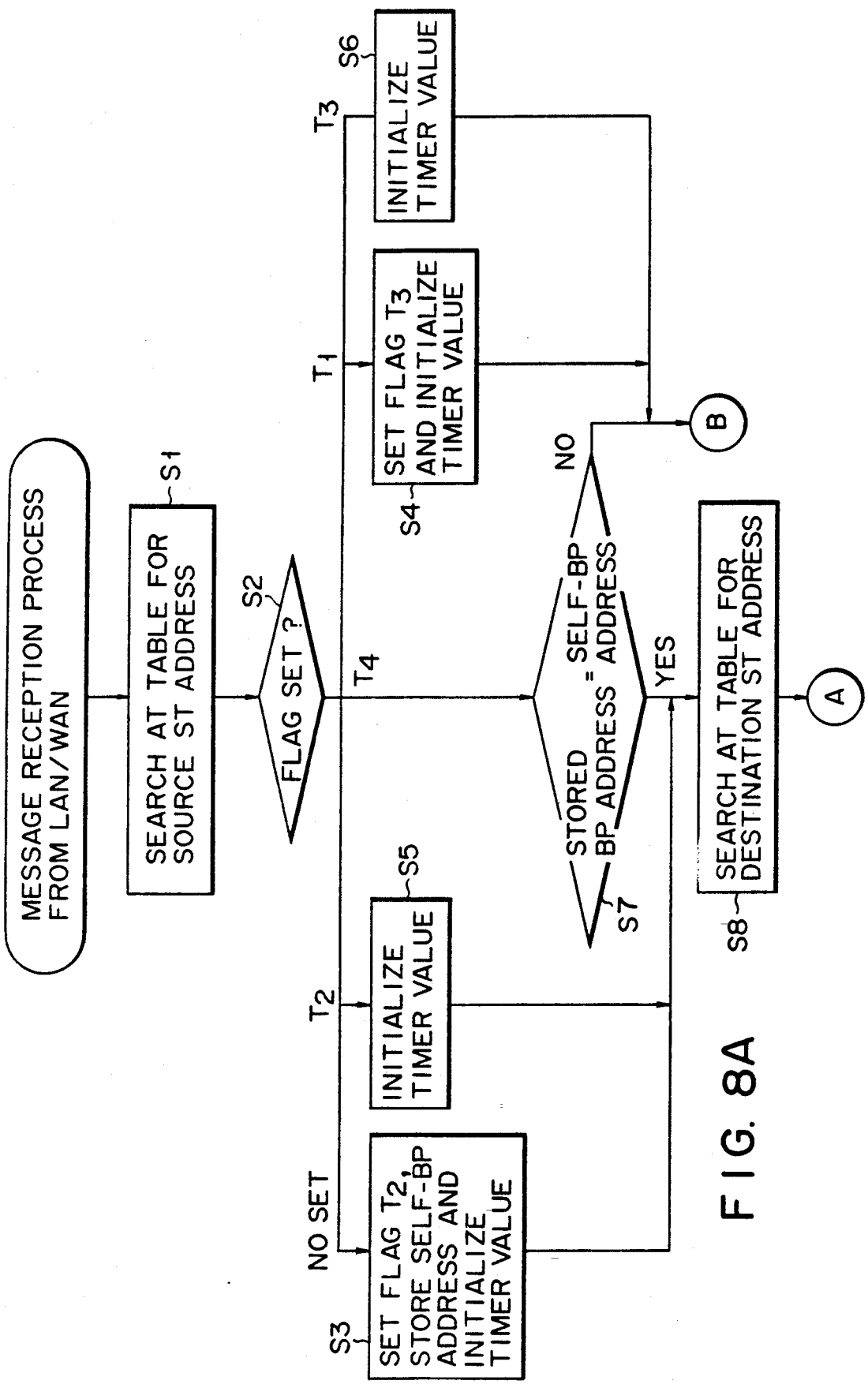
FIGS. 8A and 8B are flow charts showing message reception process from a WAN/LAN in each interface.
Figure 8B:
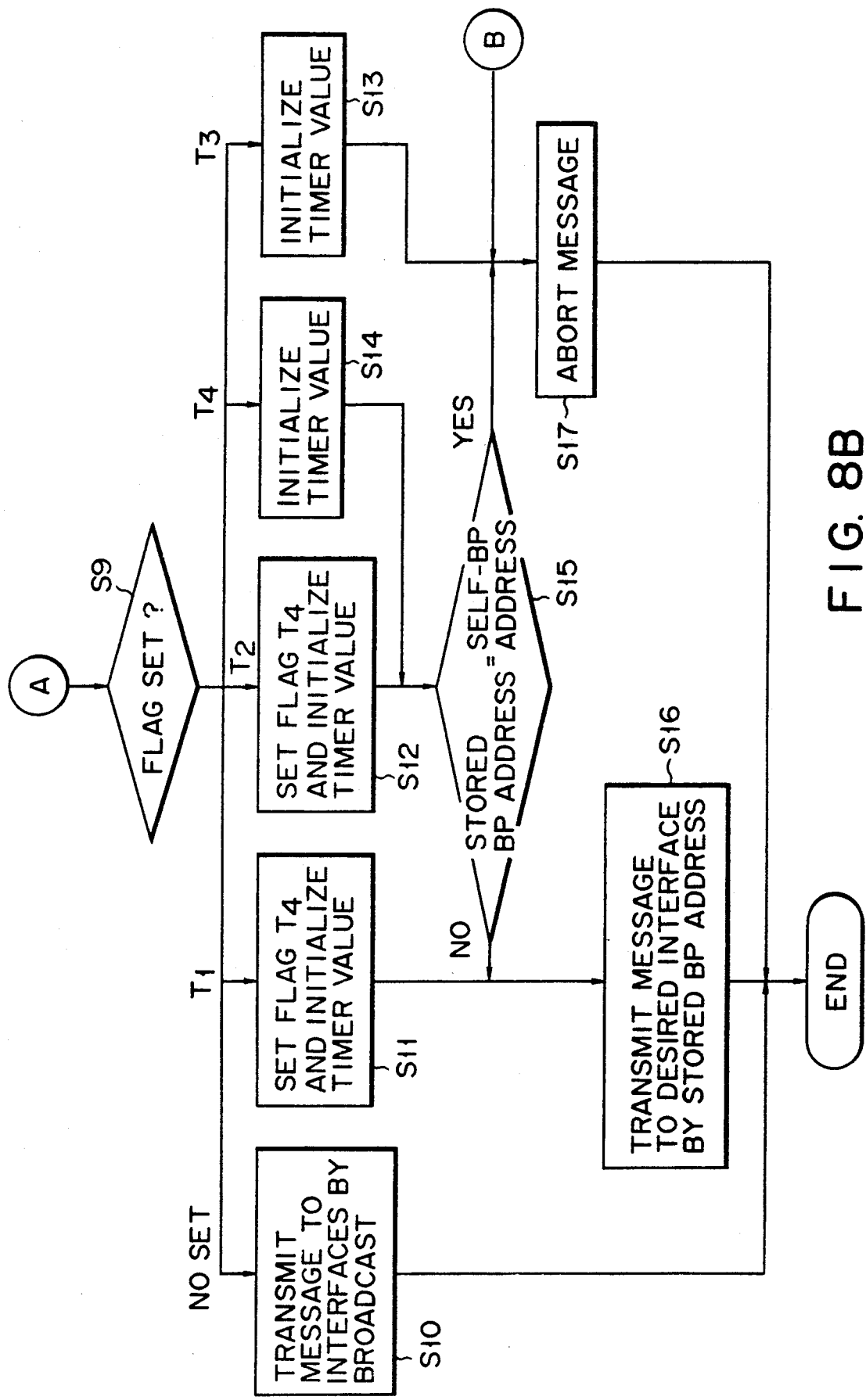
Figures 1, 9A:
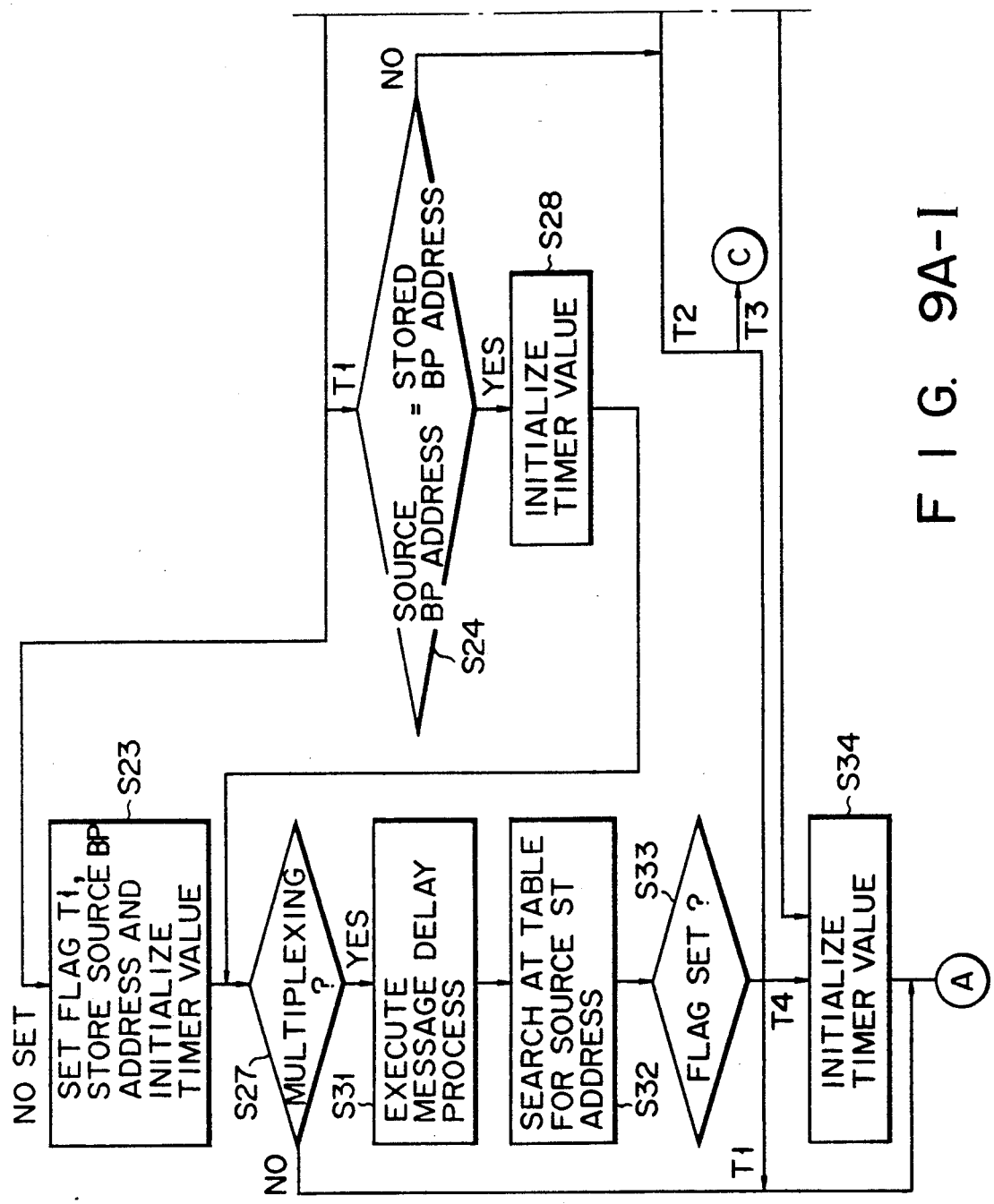
Figure 9B:
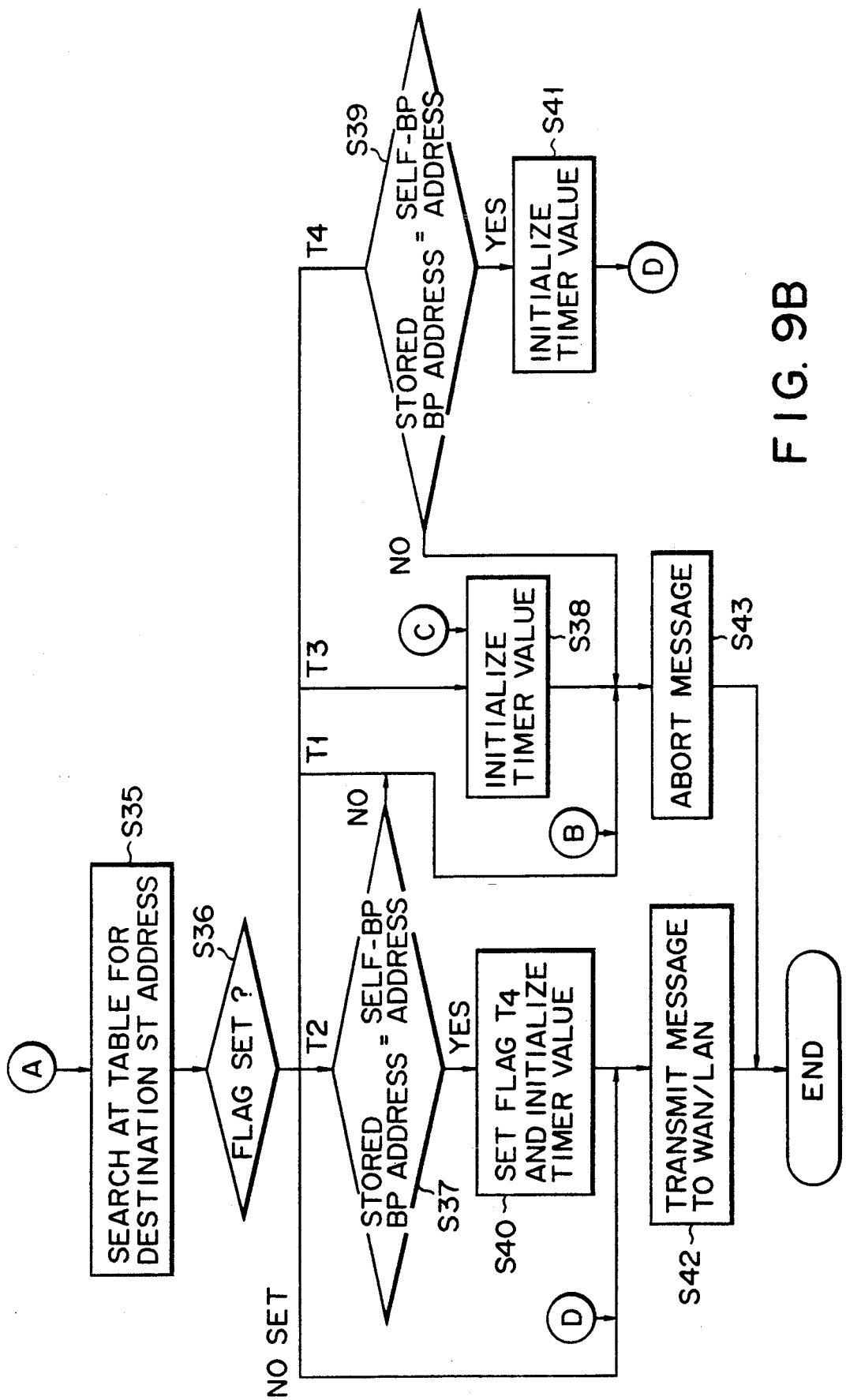

FIGS. 8A and 8B are flow charts showing operation of the processor in each interface when a message is received from a WAN (or LAN) to a WAN (or LAN) interface of each LAN connector unit. The process contents of steps S1 to S17 will be described as follows.

In step S1, the address translation (AT) table is searched for a source station (ST) address included in the received message.

In step S2, the set/reset states of flags in each entry of the address translation table for the source station address are determined. When the flag V is reset, a process in step S3 is performed. This process does not depend on the presence/absence of the source station address. When the flags V and T1, the flags V and T2, the flags V and T3, or the flags V and T4 is set, a process in one of steps S4 to S7 is performed, respectively. In this embodiment, the set state of each flag is represented by "1", and its reset state is represented by "0".

In step S3, the flags V and T1 associated with the source station address in the desired entry are set. Upon receiving the message in the interface, A bridge port address of the interface is registered as a bridge port (BP) address paired with the source station address, and the timer value is initialized.

In step S4, the flag T3 associated with the source station address is set, the flag T1 is reset, and the timer value is initialized. The bridge port address paired with the source station address is not updated.

In step S5, the timer value is initialized. The respective flags and the bridge port address paired with the source station address are not updated.

The same operations as in step S5 are performed in step S6.

In step S7, it is determined whether the bridge port address registered and paired with the source station address coincides with the bridge port address of the interface itself. If YES in step S7, a process in step S8 is performed. However, if NO in step S7, a process in step S17 is performed. For example, when a source station is moved within a predetermined period of time and a message is transmitted from a moved position or when a message is delayed and received depending on different transmission lines (to be described later), the two bridge port addresses do not coincide with each other.

In step S8, the address translation table is searched for a destination station address in the received message.

In step S9, the set/reset states of the flags for the destination station address in each entry of the address translation table are determined. When the flag V is reset, or when the flag T1, the flag T2, the flag T3 or the flag T4 is set, a process in one of steps S10 to S14 is performed, respectively.

In step S10, the broadcast bridge port address is used as a destination bridge port address and the bridge port address of the interface itself is used as a source bridge port address, and the message is transmitted by broadcast to all interfaces in the LAN connector unit through the internal network.

In step S11, the flag T4 in the desired entry associated with the destination station address is set, the flag T1 is reset, and the timer value is initialized. The bridge port address paired with the destination station address is not updated.

In step S12, the flag T4 in the desired entry associated with the destination station address is set, the flag T2 is reset, and the timer value is initialized. In this case, the bridge port address paired with the destination station address is not updated.

In step S13, the timer value is initialized. The respective flags and the bridge port address paired with the destination station address are not updated.

The same processes as in step S13 are performed in step S14.

In step S15, it is determined whether the registered bridge port address paired with the destination station address coincides with the bridge port address of the interface itself. If YES in step S15, a process in step S17 is performed. However, if NO in step S15, a process in step S16 is performed.

In step S16, the message is transmitted to the desired WAN (or LAN) interface in the LAN connector unit through the internal network by using the registered bridge port address as the destination bridge port address and the bridge port address of the interface itself as the source bridge port address.

In step S17, the message transmitted from a different set position of the source station upon a change in set position of the source station within the predetermined period of time, or the message delayed and transmitted through the different transmission line, are aborted.

FIGS. 9A-I, 9A-II, and 9B are flow charts showing operation of the processor in each interface when a message is received from the internal network to each WAN (or LAN) interface in each LAN connector unit. The process contents in steps S21 to S43 are given as follows.

In step S21, the address translation table is searched for a source station address included in the received message.

In step S22, the set/reset states of flags in each entry of the address translation table for the source station address are determined. When the flag V is reset, a process in step S23 is performed. When the flag T1, the flag T2, the flag T3, or the flag T4 is set, a process in one of steps S24, S25, S38, and S26 is performed, respectively.

In step S23, the flag T1 in the desired entry associated with the source station address is set, a bridge port address paired with the source station address is registered as a bridge port address of the source interface, and the timer value is initialized.

In step S24, it is determined whether the registered bridge port address paired with the source station address coincides with the bridge port address (source bridge port address) of the WAN (or LAN) interface. Note that the message is transmitted from this WAN (or LAN) interface. If YES in step S24, a process in step S28 is performed. However, if NO in step S24, a process in step S43 is performed. As described above, when the source station is moved within a predetermined period of time and a message is transmitted from a moved set position, or the message is delayed and received due to different transmission lines, these two bridge port addresses do not coincide with each other.

In step S25, it is determined whether the registered bridge port address paired with the source station address coincides with the source bridge port address. If YES in step S25, since the received message is a message transmitted by the interface itself, a process in step S29 is performed. However, if NO in step S25, it is determined that the interface itself is multiplexed. Therefore, in order to preferentially perform a process about the source station address by the multiplexed interface without this interface, a process in step S30 is performed.

In step S26, it is determined whether the registered bridge port address paired with the source station address coincides with the source bridge port address. If YES in step S26, a process in step S34 is performed. However, if NO in step S26, a process in step S43 is performed. As previously described, when the message is transmitted from the moved set position upon moving of the source station within the predetermined period of time, or when the message is delayed and received due to different transmission lines, the two bridge port addresses do not coincide with each other.

It step S27, upon receiving the message in the interface, it is determined whether the interface itself is multiplexed. This determination is performed by checking an ON/OFF state of a hardware switch (not shown) or the like. If YES in step S27, a process in step S31 is performed. However, if NO in step S27, a process in step S35 is performed.

In step S28, the timer value is initialized. In this case, the flags and the bridge port address paired with the source station address are not updated.

In step S29, the flag T4 in the desired entry associated with the source station address in the address translation table is set, the flag T2 is reset, and the timer value is initialized. The bridge port address paired with the source station address is not updated because the bridge port address of the interface itself has already been registered in the address translation table.

In step S30, the flag T3 in the desired entry associated with the source station address is set, the flag T2 is reset, and the timer value is initialized. The bridge port address paired with the source address is not updated because the bridge port addresses of other interface have already been registered.

In step S31, upon receiving the message, the interface is multiplexed, i.e., when this interface is one of the multiplexed interfaces, a message delay process is performed so as not to transmit the same message from the multiplexed interfaces. The message delay process in each interface will be described below.

If the bridge port addresses of the multiplexed (n-multiplexed) interfaces are given as 0, 1, 2, ... n−1, the source station address is divided by n to obtain a remainder a. If a bridge port address of the interface is given as p, a subtraction a−p in the base-n notation is performed to obtain a difference. The absolute value of the difference is multiplied with a predetermined delay time t. A result |a−p| t serves as a delay time in message transmission of each interface. When processes from step S32 are performed upon a lapse of this delay time, transmission timings of message transmission process in the n-multiplexed interfaces can be shifted from each other.

In step S32, after the message delay process is completed in step S31, the address translation table is searched for the source station address in the message received again.

In step S33, the set/reset states of the flags for the source station address in each entry of the address translation table is determined. If the flag T1, the flag T2, the flag T3, and the flag T4 are set, processes in steps S35, S43, S38, and S34 are performed, respectively.

In step S34, the timer value is initialized. The respective flag and the bridge port address paired with the source station address are not updated.

In step S35, the address translation table is searched for the destination station address in the received message.

In step S36 the set/reset states of the flags for the destination address in each entry of the address translation table are determined. If the flag V is reset, a process in step S42 is performed. When the flag T1, the flag T2, the flag T3, or the flag T4 is set, a process in one of steps S43, S37, S38, and S39 is performed, respectively.

In step S37, upon receiving the message in the interface, it is determined whether the bridge port address of the interface coincides with the registered bridge port address paired with the destination station address. If YES in step S37, a process in step S40 is performed. However, if NO in step S37, a process in step S43 is performed.

In step S38, the timer value is initialized. The respective flags and the bridge port address paired with the destination address are not updated.

In step S39, upon receiving the message in the interface, it is determined whether the registered bridge port address paired with the destination station address coincides with the bridge port address of the interface. If YES in step S39, a process in step S41 is performed. However, if NO in step S39, a process in step S43 is performed.

In step S40, the flag T4 in the desired entry associated with the destination station address is set, the flag T2 is reset, and the timer value is initialized. The bridge port address paired with the destination station address is not updated because the bridge port address of the interface itself has already been registered.

In step S41, the timer value is initialized. The respective flags and the bridge port address paired with the destination station address are not updated.

In step S42, the received message is transmitted to the WAN (or LAN).

In step S43, the received message is aborted.

FIG. 10 is a flow chart showing update process of the address translation table in each interface. This update process can be performed by the processor 41 every time it receives an interrupt signal from the timer 43 shown in FIG. 2 every predetermined time interval. More specifically, when an interrupt signal from the timer 43 is generated, a head entry number of the address translation table 42 is loaded in an address register (not shown) in step S51. In step S52, an entry representing the current entry number loaded in the address register is referred to check whether the flag V in the referred entry is set (step S53).

If YES in step S53, the timer value in the referred entry is decremented by one (step S54), and it is determined whether the decremented timer value is zero (step S55). When the timer value is zero in step S55, it is determined that the referred entry is not accessed within the predetermined period of time and the flag V of the referred entry is reset (step S56).

When the flag V is determined in step S53 to be reset, when the timer value is not zero in step S55, or when the process in step S56 is executed, it is determined whether the current entry number loaded in the address register is a final entry number (step S57). If the current entry number is determined in step S57 not to be the final entry number, the current entry number is incremented by one (step S58), and the process in step S5 is performed again. However, when the current entry number is determined to be the final entry number, the update process of the address translation table 42 is performed.

Figure 11:
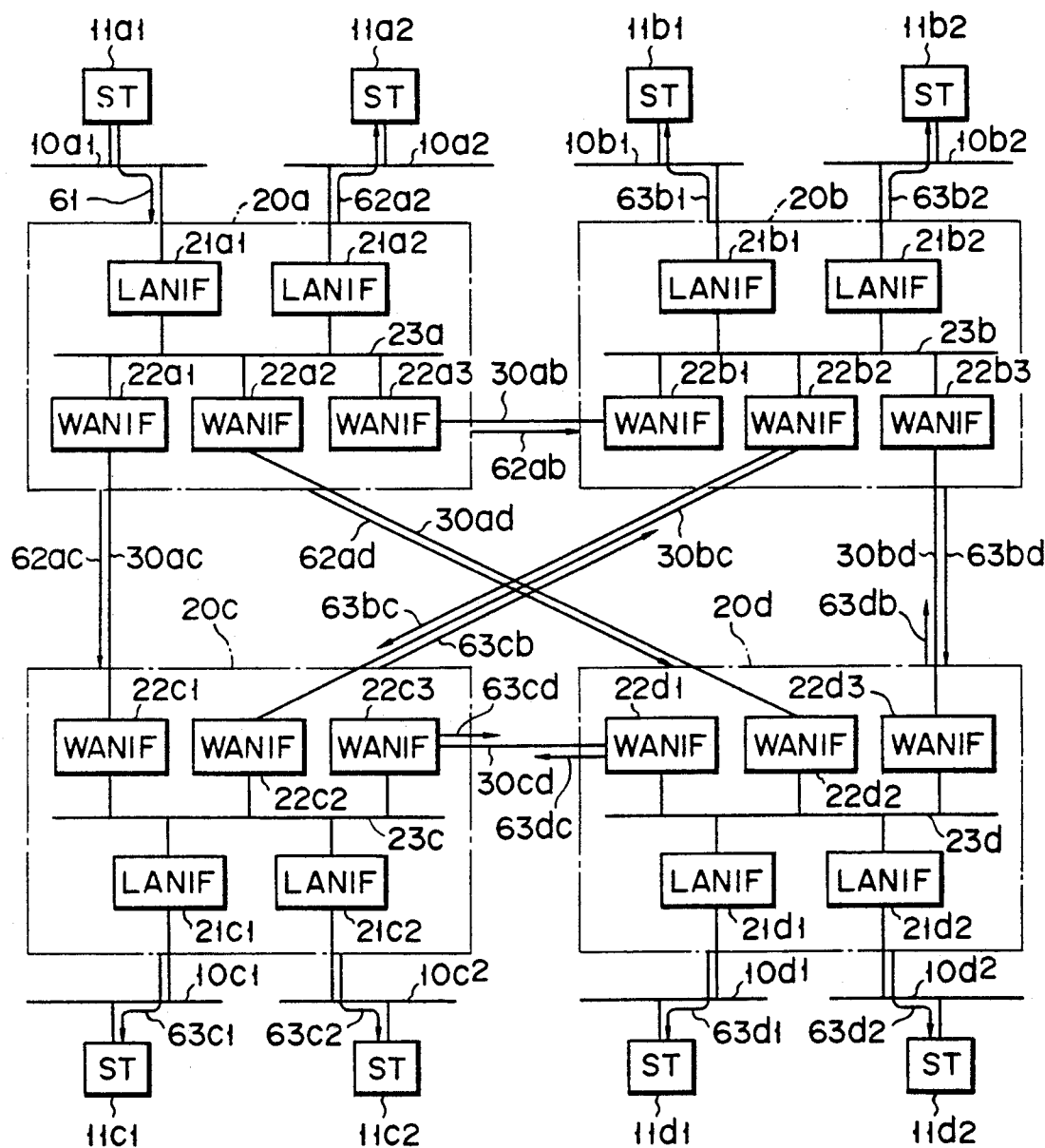
FIG. 11 is a view for explaining a flow of a message transmitted through the WAN in the network system shown in FIG. 1.

FIG. 11 is a view for explaining a message flow for transmission of the first message from the ST 11a1 on the LAN 10a1 to the ST 11d1 on the LAN 10d1 in the network system shown in FIG. 1.

A message 61 is the first message transmitted from the ST 11a1 to the ST 11d1 via the LAN 10a1 and has the same format as in FIG. 5(a). Messages 62ab, 62ac, 62ad, and 62a2 are messages respectively transmitted from the WANIFs 22a3, 22a1, and 22a2 and the LANIF 21a2 to the WANs 30ab, 30ac, 30ad, and the LAN 10a2 after the LAN connector unit 20a receives the message 61. The messages 62ab, 62ac, 62ad, and 62a2 have the same format as in FIG. 5(c).

Messages 63bc and 63bd are messages respectively transmitted from the WANIFs 22b2 and 22b3 to the WANs 30bc and 30bd after the LAN connector unit 20b receives the message 62ab and have the same format as in FIG. 5(c). Messages 63b1 and 63b2 are messages respectively transmitted from the LANIFs 21b1 and 21b2 to the LANs 10b1 and 10b2 after LAN connector unit 20B receives the message 62ab, and have the same format as in FIG. 5(c).

Messages 63cb and 63cd are messages respectively transmitted from the WANIFs 22c2 and 22c3 to the WANs 30bc and 30cd after the LAN connector unit 20c receives the message 62ac and have the same format as in FIG. 5(c). Messages 63c1 and 63c2 are messages respectively transmitted from the LANIFS 21c1 and 21c2 to the LANs 10c1 and 10c2 after the LAN connector unit 20c receives the message 62ac, and have the same format as in FIG. 5(c).

Messages 63db and 63dc are messages respectively transmitted from the WANIFs 22d3 and 22d1 to the WANs 30db and 30cd after the LAN connector unit 20d receives the message 62ad and have the same format as in FIG. 5(c). Messages 63d1 and 63d2 are messages respectively transmitted from the LANIFs 21d1 and 21d2 to the LANs 10d1 and 10d2 after the LAN connector unit 20d receives the message 62ad and have the same format as in FIG. 5(c).

An operation of the network system of present embodiment shown in FIG. 1 will be explained for transmission of the first message from the ST 11a1 on the LAN 10a1 to the ST 11d1 on the LAN 10d1. For the sake of descriptive simplicity, transmission speeds of the WANs in the network system are set to be equal to each other, and the loads of the interfaces in the LAN connector units 20a to 20d are also set to be equal to each other. The message 61 having the same format as in FIG. 5(a) is transmitted from the ST 11a1 to the LAN 10a1.

The message 61 on the LAN 10a1 is received by the LANIF 21a1 in the LAN connector unit 20a and is stored in the memory 44 in the LANIF 21a1. Upon receiving this message, the message reception process is started in the LANIF 21a1 in accordance with the flow charts in FIGS. 8A and 8B.

More specifically, the AT table 42 is searched for the source station address in the message 61 stored in the memory 44 (step S1), and the set/reset state of the flag in each entry is determined (step S2). When the received message is determined to be the first message, the source station address is not registered in a desired entry of the AT table 42, and the flag V is in the reset state. In this case, the flag V and the flag T2 in the desired entry of the AT table 42 are set, the station address of the ST 11a1 is registered as the source station address in the received message, the bridge port address of the LANIF 21a1 is registered as the source bridge port address, and the timer value is initialized (step S3).

The AT table is searched for the destination station address (station address of the ST 11d1) in the message 61 (step S8), and the set/reset state of each flag in each entry is determined (step S9). If the received message is the first message, the flag V is in the reset state. In this state, the broadcast bridge port address is used as the destination bridge port address, and the bridge port address of the LANIF 21a1 is used as the source bridge port address. The message 61 is transmitted by broadcast to the respective interfaces in the LAN connector unit 20a through the internal network 23a in the same format as in FIG. 5(b) (step S10).

The broadcast message including the message 61 transmitted from the LANIF 21a1 to the internal network 23a is almost simultaneously received by the LANIFs 21a1 and 21a2 and the WANIFs 22a1 to 22a3 in the LAN connector unit 20a. In each of the interfaces, i.e., the LANIFs 21a1 and 21a2 and the WANIFs 22a1, 22a2, and 22a3, the message reception process is started in accordance with the flow charts in FIGS. 9A-I, 9A-II, and 9B.

In each interface, the AT table is searched for the source station address (station address of the ST 11a1) in the message 61 included in the received broadcast message (step S21), and the set/reset state of each flag is determined (step S22).

The source station addresses are not registered in desired entries of the AT table of the interfaces (i.e., the LANIF 21a2 and the WANIFs 22a1 to 22a3) without the LANIF 21a1, and the flags V are reset. Therefore, in the LANIF 21a2 and the WANIFs 22a1 to 22a3, the flags V and T1 in the desired entries of the AT tables are set. Further, in each interface, the station address of the ST 11a1 in the message 61 included in the received broadcast message is registered as the source station address, the bridge port address of the LANIF 21a1 is registered as the source bridge port address, and the timer value is initialized (step S23).

In the interfaces 21a2, and 22a1 to 22a3, for example, it is determined whether these interfaces are multiplexed on the basis of states of hardware switches (step S27). The interfaces are not multiplexed, the AT table is searched for the destination station address (station address of the ST 11d1) in the message 61 included in the received broadcast message, and the set/reset state of each flag is determined. In this result, the destination station address (station address of the ST 11d1) is not registered in the desired entries of the AT tables of the interfaces 21a2 and 22a1 to 22a3, and the flags V are in the reset state. In this case, the interfaces 21a2 and 22a1 to 22a3 almost simultaneously transmit the message 61 included in the received broadcast message as the messages 62a2, 62ac, 62ad, and 62ab to the LAN 10a2 and the WANs 30ac, 30ad, and 30ab, respectively.

On the other hand, upon receiving the broadcast message in the LANIF 21a1, the flag T2 in the desired entry of the AT table of the LANIF 21a1 is set. In this entry, the station address of the ST 11a1 and the bridge port address of the LANIF 21a1 are registered. Therefore, in the LANIF 21a1, unlike the interfaces 21a2, and 22a1 to 22a3, the flag T2 is determined to be set. It is also determined whether the source bridge port address of the received broadcast message coincides with the registered bridge port address in the desired entry of the AT table (step S25). Since these two bridge port addresses coincide with each other, a flag to be set in the desired entry of the AT table is updated from the flag T2 to the flag T4, and the timer value is initialized (step 29). In this case, the bridge port address in the desired entry is not updated. That is, the bridge port address of the LANIF 21a1 is not updated. The ST 11a1 represented by the registered address in the desired entry of the AT table is authentically registered to be connected to the LANIF 21a through the LAN 10a1. Since the received broadcast message is transmitted by the LANIF 21a1, it is aborted (step S43).

As described above, when the first message 61 is transmitted to the LANIF 21a1 in the LAN connector unit 20a through the LAN 10a1 by using the ST 11d1 as the destination station and the ST 11a1 as the source station, the broadcast message including the message 61 is transmitted by broadcast from the LANIF 21a1 to the interfaces of the LAN connector unit 20a. The messages 62a2, 62ac, 62ad, and 62ab corresponding to the message 61 are almost simultaneously transmitted from the respective interfaces without the LANIF 21a1, i.e., the LANIF 21a2 and the WANIFs 22a1 to 22a3, to the LAN 10a2, and the WANs 30ac, 30ad, and 30ab, respectively. The flag to be set in the desired entry associated with the source station address in the AT table of the LANIF 21a1 is changed from the flag T2 to the flag T4. Flags to be set in the desired entries of the AT tables of the interfaces 21a2, and 22a1 to 22a3 are changed to the flag T1. In the desired entry of the AT table of each interface of the LAN connector unit 20a, the station address of the ST 11a is registered as the source station address, and the bridge port address of the LANIF 21a1 is registered as the source bridge port address paired with this source station address.

The messages 62ac, 62ad, and 62ab transmitted from the WANIFs 22a1, 22a2, and 22a3 in the LAN connector unit 20a to the WANs 30ac, 30ad, and 30ab are almost simultaneously received by the WANIFs 22c1, 22d2, and b1 in the corresponding LAN connector units 20c, 20d, and 20b, respectively. Upon receiving these message, the WANIFs 22c1, 22d2, and 22b1 perform message reception process in accordance with the flow charts in FIGS. 8A and 8B.

In the WANIF 22d2 of the LAN connector unit 20d, for example, the AT table is searched for the source station address in the message 62ad (the destination is the ST 11d1, and the source is the ST 11a1) received from the WAN 30ad, and the set/reset state of the flag in each entry is determined (steps S1 and S2). If the received message is the first message, since the flag is not set yet, flags V and T2 are set in the desired entry of the AT table. In addition, the station address of the ST 11a1 in the message 62ad is registered as the source station address, the bridge port address of the WANIF 22d2 is registered as the source bridge port address, and the timer value is initialized (step S3).

In the WANIF 22d2, the AT table is searched for the destination station address (i.e., the station address of the ST 11d1) in the message 62ad, and the set/reset state of the flag in each entry is determined (steps S8 and S9). If the received message is the first message, the flag is not set yet. Therefore, the broadcast bridge port address is used as the destination bridge port address, and the bridge port address of the WANIF 22d2 is used as the source bridge port address. The message 62ad is transmitted to each interface in the LAN connector unit 20d through the internal network 23d in the same format as in FIG. 5(d) (step S10).

The broadcast message including the message 6ad transmitted from the WANIF 22d2 to the internal network 23d is almost simultaneously received by the respective interfaces in the LAN connector unit 20d, i.e., the LANIFs 21d1 and 21d2 and the WANIFs 22d1 to 22d3. Therefore, each of the interfaces 21d1, 21d2, and 22d1 to 22d3 performs the message reception process in accordance with the flow charts in FIGS. 9A-I, 9A-II, and 9B.

The AT table is searched for the source station address (station address of the ST 11a1) of the message 62ad included in the received broadcast message in each interface (step S21), and the set/reset state of the flag in each entry is determined (step S22). Note that the broadcast message is transmitted from the WANIF 22d2.

In each of the interfaces 21d1, 21d2, 22d1, and 22d3 without the WANIF 22d2, since flags are determined not to be set, the flag T1 is set in the desired entries of the AT table. The station address of the ST 11a1 in the message 62ad included in the received broadcast message is registered as the source station address, the bridge port address of the WANIF 22d2 is registered as the source bridge port address, and the timer value is initialized (step S23).

The interfaces 21d1, 21d2, 22d1, and 22d3 almost simultaneously transmit the same message 62ad as the message 61 included in the received broadcast message to the LANs 11d1 and 11d2, and the WANs 30cd and 30bd as the messages 63d1, 62d2, 63dc, and 63db, respectively. Therefore, the ST 11d1 on the LAN 10d1 can receive the message 63d1 such that the destination station is the ST 11d1 itself and the source station is the ST 11a1.

In the desired entry of the AT table of the WANIF 22d2, the the flag T2 is set. In this entry, the station address of the ST 11a1 is registered as the source station address, and the bridge port address of the WANIF 22d2 is registered as the source bridge port address. In the WANIF 22d2, it is determined whether the source bridge port address in the received broadcast message coincides with the registered bridge port address in the desired entry of the AT table (step S25). Since the two bridge port addresses coincide with each other, a flag to be set in the desired entry of the AT table is changed from the flag T2 to the flag T4. The source bridge port address (the bridge port address of the WANIF 22d2) is not changed, and the timer value is initialized (step S29). Therefore, The ST 11a1 represented by the registered source station address in the desired entry of the AT table is authentically registered to be indirectly connected to the WANIF 22d2. The received broadcast message is aborted (step S43).

When the first message 62ad (the destination station is the ST 11d1 and the source station is the ST 11a1) corresponding to the message 61 is transmitted from the WANIF 22a2 to the WANIF 22d2 through the WAN 30ad, the broadcast message including the message 62ad is transmitted by broadcast from the WANIF 22d2 to the interfaces 21d1, 21d2, 22d1, 22d2, and 22d3 through the internal network 23d. Upon reception of these messages through the internal network 23d, the interfaces 21d1, 21d2, 22d1, and 22d3 almost simultaneously transmit the messages 63d1, 63d2, 63dc, and 63db corresponding to the message 62ad to the LANs 10d1, 10d2, and the WANs 30cd and 30bd. In the desired entry associated with the source station address in the AT table of the WANIF 22d2, a flag to be set is changed from the flag T2 to the flag T4. In the desired entries of the AT tables of the interfaces 21d1, 21d2, 22d1, and 22d3, the flag T1 is set. In the desired entries of the AT tables of the interfaces 21d1, 21d2, 22d1, 22d2 and 22d3, the station address of the ST 11a1 is registered as the source station address, and the bridge port address of the WANIF 22d2 is registered as the source bridge port address.

The above operations also apply to the LAN connector units 20b and 20c.

When the first message 62ab (the destination station is the ST 11d1 and the source station is the ST 11a1) corresponding to the message 61 is transmitted from the WANIF 22a3 to the WANIF 22b1 through the WAN 30ab in the LAN connector unit 20b, the broadcast message including the message 62ab is transmitted by broadcast from the WANIF 22b1 to the respective interfaces through the internal network 23b. Upon receiving the broadcast message from the internal network 23b, the interfaces 21b1, 21b2, 22b2, and 22b3 almost simultaneously transmit the messages 63b1, 63b2, 63bc, and 63bd corresponding to the message 62ab to the LANs 10b1 and 10b2 and the WANs 30bc and 30bd. In the desired entry associated with the source station address of the AT table of the WANIF 22b1, a flag to be set is changed from the flag T2 to the flag T4. In the desired entries of the AT tables of the interfaces 21b1, 21b2, 22b2, and 22b3, the flag T1 is set. In the desired entry in the AT table of each of the interfaces 21b1, 21b2, 22b1, 22b2, and 22b3, the station address of the ST 11a1 is registered as the source station address, and the bridge port address of the WANIF 22b1 is registered as the source bridge port address paired with this source station address.

Similarly, when the first message 62ac (the destination station is the ST 11d1 and the source station is the ST 11a1) corresponding to the message 61 is transmitted from the WANIF 22a1 to the WANIF 22c1 through the WAN 30ac in the LAN connector unit 20c, the broadcast message including the message 62ac is transmitted by broadcast from the WANIF 22c1 to each interface through the internal network 23c. Upon receiving the broadcast message from the internal network 23c, the interfaces 21c1, 21c2, 22c2, and 22c33 almost simultaneously transmit the messages 63c1, 63c2, 63cb, and 63cd to the LANs 10c1 and 10c2 and the WANs 30bc and 30cd. In the desired entry associated with the source station address in the AT table of the WANIF 22c1, a flag to be set is changed from the flag T2 to the flag T4. In the desired entries of the AT tables of the LANIFs 21c1 and 21c2 and the WANIFs 22c2 and 22c3, the flag T1 is set. In the desired entries of the AT tables of the LANIFs 21c1 and 21c2 and the WANIFs 22c1 to 22c3, the station address of the ST 11a1 is registered as the source station address, and the bridge port address of the WANIF 22c1 is registered as the source bridge port address paired with this source station address.

As is apparent from the above description, when the first message 61 (the destination station is the ST 11d1) is transmitted from the ST 11a1 to LAN 10a1, the message 61 is transmitted from the LAN connector unit 20a to the LAN connector units 20b, 20c, and 20d through the WANs 30ab, 30ac, and 30ad as the message 62ab, 62ac, and 62 ad.

The message 62ab is transmitted from the LAN connector unit 20b to the LAN connector units 20c and 20d through the WANs 30bc and 30bd as the message 63bc and 63bd.

Similarly, the message 62ac is transmitted from the LAN connector unit 20c to the LAN connector units 20b and 20d through the WANs 30bc and 30cd as the message 63cb and 63cd, and the message 62ad is transmitted from the LAN connector unit 20d to the LAN connector units 20b and 20c through the WANs 30bd and 30cd as the message 63db and 63dc.

Three messages having substantially identical contents are transmitted from independent interfaces to the LAN connector units 20b to 20d, respectively. In this embodiment, since transmission times of these messages to the LAN connector unit differ from each other, messages without the first received message to LAN connector unit are aborted. Message abort process in the LAN connector unit 20d will be explained below.

The three identical messages 62ad, 63bd, and 63cd are transmitted through the WANs 30ad, 30bd, and 30cd in the LAN connector unit 20d and are received by the WANIFs 22d1 to 22d3, respectively. In this embodiment, the transmission speeds of the WANs in the network system and the loads of the interfaces in the LAN connector unit are assumed to be equal to each other. For this reason, of the three messages 62ad, 63bd, and 63cd, the message 62ad transmitted from the WANIF 22a2 reaches the LAN connector unit 20d first.

When the message 62ad is received by the WANIF 22d2, the messages 63d1, 63d2, 63dc, and 63db corresponding to the message 62ad are transmitted from the interfaces 21d1, 21d2, 22d1, and 22d3 to the LANs 10d1 and 10d2 and the WANs 30cd and 30bd, respectively. The flag T4 is set in the desired entry associated with the source station address in the AT table of the WANIF 22d2. The flags T1 are respectively set in the desired entries in the AT tables of the interfaces 21d1, 21d2, 22d1, and 22d3. In the desired entries of the AT tables of the interfaces 21a1, 21a2, 22a1, 22a2, and 22a3, the address of the ST 11a1 is registered as the source station address, and the bridge port address of the WANIF 22d2 is registered as the source bridge port address.

In this state, when the delayed message 63bd having the same content as that of the message 62ad is transmitted from the WANIF 22b3 to the WANIF 22d3 through the WAN 30bd, the WANIF 22d3 starts the message reception process in accordance with the flow charts in FIGS. 8A and 8B.

Since the flag T1 is set in the desired entry for the source station address (i.e., the station address of the ST1) of the AT table of the WANIF 22d3, the flag T3 is set in the desired entry of the AT table, the source bridge port address is not changed (i.e., the source bridge port address is the bridge port address of the WANIF 22d2), and the timer value is initialized (step S4). Upon setting of the flag T3, the WANIF 22d3 operates a standby interface for the station address of the ST 11a1 and aborts the delayed message.

Similarly, the flag T3 is set in the desired entry for the source station address (station address of the ST 11a1) in the AT table of the WANIF 22d1, and the delayed message 63cd is aborted.

The flags T3 are set in the desired entries of the AT tables of the WANIFs 22b2 and 22b3, and the delayed messages 63cd and 63db are aborted.

Similarly, in the WANIFs 22c2 and 22c3, the flags T3 are set in the desired entries of the AT tables, and the delayed messages 63bc and 63dc are aborted.

When the message 63d1 (the destination station is the ST 11d1 and the source station is the ST 11a1) transmitted from the LANIF 21d1 to the LAN 10d1 is received by the ST 11d1 on the LAN 10d1, a response message (the source station is the ST 11d1 and the destination station is the ST 11a1) transmitted onto the LAN 10d1. The response message is received by the LANIF 21d1 and the message reception process is started in accordance with the flow charts in FIGS. 8A and 8B.

Since the flags are reset in the desired entry for the source station address (station address of the ST 11d1) in the AT table of the LANIF 21d1 (steps S1 and S2), the flag T2 is then set in the desired entry of the AT table, and the timer value is initialized. In addition, the station address of the ST 11d1 included in the received response message is registered as the source station address, and the bridge port address of the LANIF 21d1 is registered as the source bridge port address (step S3).

The set/reset state of the flag in the desired entry of the AT table for the destination station address (the station address of the ST 11a1) is determined (step S8). Since the flag T1 is already set, the flag to be set in the desired entry for the station address of the ST 11a1 in the AT table is changed from the flag T1 to the flag T4, and the timer value is initialized (step S11). The destination bridge port address is kept set as the bridge port address of the WANIF 22d2. The bridge port address of the WANIF 22d2 in the desired entry of the AT table is used as the destination bridge port address, and the bridge port address of the LANIF 21d1 is used as the source bridge port address. The message having the same format as in FIG. 5(b) and having the same content as that of the response message is transmitted from the LANIF 21d1 to the WANIF 22d2 through the internal network 23d (step S16).

The message transmitted from the LANIF 21d1 to the internal network 23d is received by only the WANIF 22d2 designated by the destination bridge port address. When the message (including the response message for the ST 11a1) from the LANIF 21d1 is received by the WANIF 22d2, the message reception process is started in accordance with the flow charts in FIGS. 9A-I, 9A-II, and 9B.

In this case, since the flag is kept reset in the desired entry for the source station address (station address of the ST 11d1) in the AT table of the WANIF 22d2 (steps S21 and S22), the flag T1 is set in the desired entry of the AT table, and the timer value is initialized. In addition, the station address of the ST 11d1 included in the received message is registered as the source station address, and the bridge port address of the LANIF 21d1 is registered as the source bridge port address (step S23).

The set/reset state of the flag in the desired entry for the destination station address (the station address of the ST 11a1) in the AT table is determined (steps S35 and S36). Since the flag T4 is set, it is determined whether the bridge port address registered in the desired entry of the AT table coincides with the bridge port address of the WANIF 22d2 (step S39). Since these two bridge port addresses coincide with each other, the flag T4 and the bridge port address of the WANIF 22d2 in the desired entry of the AT table are not changed, and the timer value is initialized (step S41). The response message in the received message is transmitted from the WANIF 22d2 to the WAN 30ad (step S42).

The response message (the destination station is the ST 11a1 and the source station is the ST 11d1) transmitted from the WANIF 22d2 to the WAN 30ad is received by the WANIF 22a2 in the LAN connector unit 20a, and the message reception process is started in accordance with the flow charts in FIGS. 8A and 8B.

Since the flag in the desired entry for the source station address (station address of the ST 11d1) in the AT table of the WANIF 22a2 is reset (steps S1 and S2), the flag T2 is set in the desired entry of the AT table, and the timer value is initialized. In addition, the station address of the ST 11d1 in the received response message is registered as the source station address, and the bridge port address of the WANIF 22a2 is registered as the source bridge port address (step S3).

The set/reset state of the flag in the desired entry for the destination station address (the station address of the ST 11a1) in the AT table is determined (steps S8 and S9). Since the flag T1 is set, the flag to be set in the desired entry for the station address of the ST 11a1 in the AT table is changed from the flag T1 to the flag T4, and the timer value is initialized. However, the port address of the LANIF 21a1 not changed (step S11).

Therefore, the ST 11a1 represented by the destination station address registered in the desired entry of the AT table of the WANIF 22a2 is authentically registered to be indirectly connected to the WANIF 22d2. The bridge port address of the LANIF 21a1 registered in the desired entry of the AT table is used as the destination bridge port address, and the bridge port address of the WANIF 22a2 is used as the source bridge port address. The message having the same format as in FIG. 5(d) and having the same content as that of the response message is transmitted from the WANIF 22a2 to the LANIF 21a1 through the internal network 23a (step S16).

The message transmitted from the WANIF 22a2 to the internal network 23a is received by only the LANIF 21a1 represented by the destination bridge port address included in this message. When the message (including the response message for the ST 11a1) from the WANIF 22a2 is received by the LANIF 21a1, the message reception process is started in accordance with the flow charts shown in FIGS. 9A-I, 9A-II, and 9B.

Since the flag in the desired entry associated with the source station address (station address of the ST 11d1) in the AT table of the LANIF 21a1 is reset (steps S21 and S22), the flag T1 is set in the desired entry of the AT table, and the timer value is initialized. In addition, the station address of the ST 11d1 in the received message is registered as the source station address, and the bridge port address of the WANIF 22a2 is registered as the source bridge port address (step S23).

The set/reset state of the flag in the desired entry for the destination station address station address of the ST 11a1) in the AT table is determined (steps S35 and S36). Since the flag T4 is set, it is then determined whether the bridge port address registered in the desired entry of the AT table coincides with the self-BP address of the LANIF 21a1 (step S39). Since the two bridge port addresses coincide with each other, the timer value is initialized (step S41). Note that the flag T4 in the desired entry of the AT table and the bridge port address of the LANIF 21a1 are not changed. The response message in the received message is transmitted from the LANIF 21a1 to the LAN 10a1 (step S42). As a result, the response message (the destination station is the ST 11a1 and the source station is the ST 11d1) can be received by the ST 11a1 on the LAN 10a1.

The response message from the ST 11d1 to the ST 11a1 is transmitted in a transmission flow opposite to the transmission flow as shown in FIG. 4. After the response message is received by the ST 11a1, the message from the ST 11a1 to the ST 11d1 is transmitted in the transmission flow as shown in FIG. 4.

In this embodiment, the transmission speeds of the WANs in the network system and the loads of the interfaces are set to be equal to each other. If these conditions are different selection for other transmission lines to prevent failure intervals in the WANs due to different message arrival times, and selection for other transmission lines in accordance with the load balance of the WANs are automatically executed.

In the above embodiment, the interfaces in each LAN connector unit are not multiplexed. However, the present invention is also applicable to a case wherein interfaces are multiplexed, as will be described below.

Figure 12:
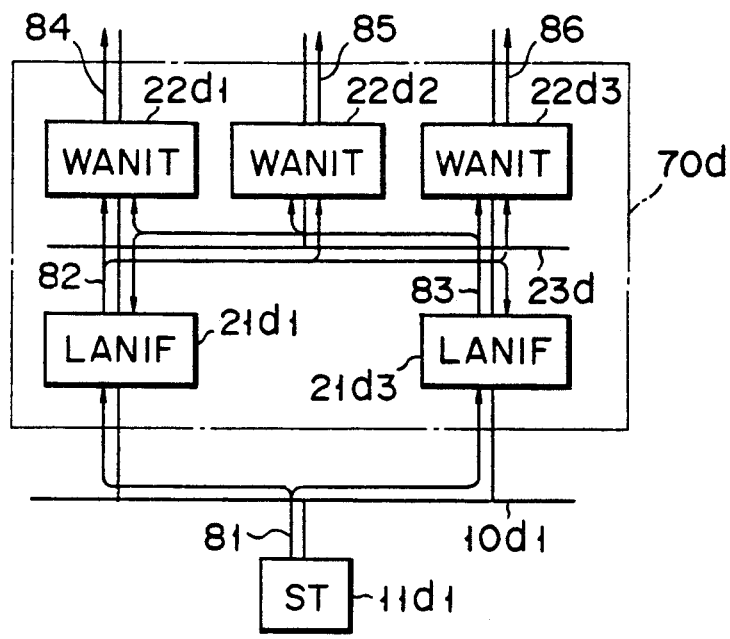
FIGS. 12 and 13 are views for explaining flows of a message in a duplexed LAN interface.
Figure 13:
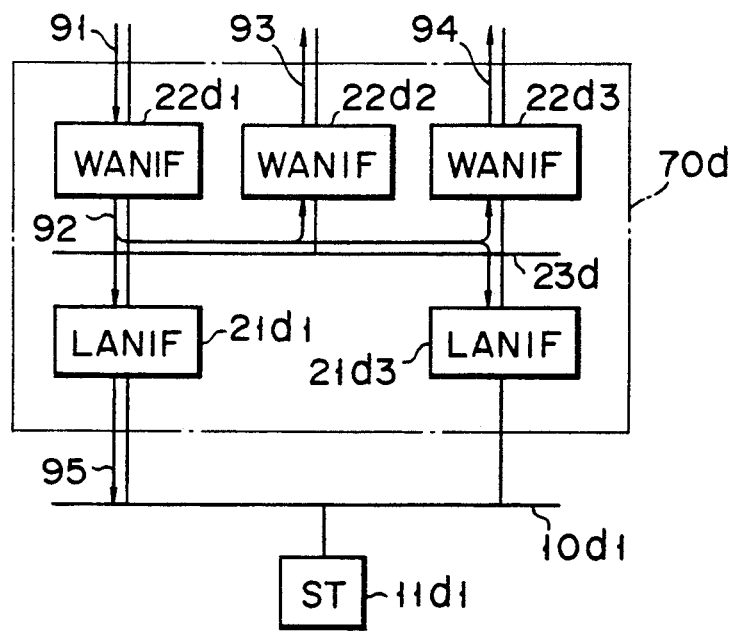

FIGS. 12 and 13 show operations in which the LANIF in the LAN connector unit 20d is duplexed. The LANIF 21d2 in the LAN connector unit 20d in FIG. 1 is not illustrated.

Referring to FIGS. 12 and 13, in a LAN connector unit 70d, an LANIF 21d3 paired with an LANIF 21d1 is connected between an internal network 23d and a LAN 10d1. That is, in the LAN connector unit 70d, the LANIFs 21d1 and 21d3 constitute duplexed interfaces for the LAN 10d1.

An operation for transmitting a first message 81 from the ST 11d1 to the LANIFs 21d1 and 21d3 will be described with reference to FIG. 12.

The message 81 transmitted from the ST 11d1 through the LAN 10d1 is received by the duplexed LANIFs 21d1 and 21d3. Upon receiving the message 81, the LANIFs 21d1 and 21d3 start the message reception process in accordance with the flow charts in FIGS. 8A and 8B.

In this case, since the received message is the first message, the flag T2 is set in the desired entry for the source station address (station address of the ST 11d1) in the AT tables of the LANIFs 21d1 and 21d3. The station address of the ST 11d1 is registered as the source station address, and bridge port addresses of the LANIF 21d1 and an LANIF 21d3 are registered as the source bridge port addresses (step S3). Broadcast messages 82 and 83 (the broadcast bridge port address is the destination bridge port address, and the bridge port addresses of the LANIFs 21d1 and 21d3 are the source bridge port addresses) each including the message 81 are transmitted from the LANIFs 21d1 and 21d3 to an internal network 23d (step S10). In this case, assume that the broadcast message 82 from the LANIF 21d1 is transmitted onto the internal network 23d first, and then the broadcast message 83 from the LANIF 21d3 is transmitted onto the internal network 23d.

The broadcast message 82 transmitted from the LANIF 21d1 is received by the respective interfaces in the LAN connector unit 70d. The interfaces 22d1 to 22d3, 21d1, and 21d3 start the message reception process in accordance with the flow charts in FIGS. 9A-I, 9A-II, and 9B.

Since the flags are reset in the desired entries for the source station addresses (station address of the ST 11d1) in the AT tables of the WANIFs 22d1 to 22d3 (steps S21 and S22), the flag T1 is set in the desired entries of the AT tables, and the bridge port address of the LANIF 21d1 is registered as the source bridge port address (step S23). Since the flags are reset in the desired entries for the destination station address (steps S35 and S36), messages 84 to 86 corresponding to the message 81 included in the received broadcast message 82 are transmitted (step S42).

On the other hand, in the LANIF 21d1, the flag T2 is already set in the desired entry for the source station address (station address of the ST 11d1) in the AT table, and the bridge port address of the LANIF 21d1 registered in this entry coincides with the source bridge port address (steps S22 and S25). Therefore, the flag to be set in the desired entry of the A table is changed from the flag T2 to the flag T4, and the timer value is initialized (step S29). Note that the source bridge port address is kept as the bridge port address of the LANIF 21d1. The ST 11d1 represented by the source station address is authentically registered in the AT table to be connected to the LANIF 21d1 through the LAN 10d1. The received broadcast message 82 is aborted (step S43).

In LANIF 21d3, since the flag T2 is set in the desired entry for the source station address (station address of the ST 11d1) in the AT table of the LANIF 21d3, and the bridge port address of the LANIF 21d3 registered in this entry is different from the source bridge port address (the bridge port address of the LANIF 21d1) (steps S22 and S25). Therefore, the flag to be set in this desired entry in the AT table is changed from the flag T2 to the flag T3, and the timer value is initialized (step S30). Note that the source bridge port address is kept as the bridge port address of the LANIF 21d3. The LANIF 21d1 having a higher priority than the LANIF 21d3 is connected to the LAN 10d1 connected to the ST 11d1 represented by the source station address. That is, the LANIF 21d3 used as a backup LAN interface. The received broadcast message 82 is aborted (step S43).

The broadcast message 83 delayed from the broadcast message 82 and transmitted from the LANIF 21d3 to the internal network 23d is received by the respective interfaces in the LAN connector unit 70d. Therefore, the interfaces 22d1 to 22d3, 21d1, and 21d3 start the message reception process in accordance with the flow charts in FIGS. 9A-I, 9A-II, and 9B.

In the WANIFs 22d1 to 22d3, the flag T1 is set in the desired entry for the source station address (station address of the ST 11d1) in the AT tables, and the bridge port address (the bridge address of the LANIF 21d1) registered in this entry is different from the source bridge port address (the bridge port address of the LANIF 21d3) (steps S22 and S24). Therefore, the delayed broadcast message 83 is aborted (step S43).

In the LANIF 21d1, the flag T4 is set in the desired entry for the source station address (station address of the ST 11d1) in the AT table and the bridge port address of the LANIF 21d1 registered in this entry is different from the source bridge port address (the address of the LANIF 21d3) (steps S22 and S26). Therefore, the delayed broadcast message 83 is aborted (step S43).

In the LANIF 21d3, since the flag T3 is set in the desired entry for the source station address (station address of the ST 11d1) in the AT table (steps S22 and S38), the broadcast message 83 is aborted (step S43).

As described above, the message 81 transmitted from the ST 11d1 to the LAN 10d1 is transmitted as the message 82 from the duplexed LANIF 21d1 to the internal network 23d. The messages 84 to 86 corresponding to the message 82 are transmitted from the WANIFs 22d1 to 22d3 connected to the internal network 23d.

Referring to FIG. 13, an operation for receiving a message (the destination station is the ST 11d1) from the duplexed LANIF 21d1 or 21d3 to the ST d1 will be described below.

When the WANIF 22d1 receives a message 91 (the destination station is the ST 11d1), the WANIF 22d1 starts the message reception process in accordance with the flow charts in FIGS. 8A and 8B.

In this case, since the received message 91 is the first message, a broadcast message 92 having the bridge port address of the WANIF 22d1 as the source bridge port address is transmitted to the internal network 23d (step S10). The broadcast message 92 on the internal network 23d is received by the respective interfaces in the LAN connector unit 70d. Therefore, the interfaces 22d1 to 22d3. 21d1 and 21d3 start the message reception process in accordance with the flow charts in FIGS. 9A-I, 9A-II, and 9B.

In the WANIFs 22d2 and 22d3, since the broadcast message 92 is the first message, messages 93 and 94 corresponding to the message 91 in the broadcast message 92 are transmitted (step S42), and the broadcast message 92 is aborted (step S43).

In the LANIFs 21d1 and 21d3, the flags T1 are set in the desired entry for the source station address in the AT tables, and the bridge port address of the WANIF 22d1 is registered as the source bridge port address (step S23). Since the LANIFs 21d1 and 21d3 are duplexed (step S27), the message delay process is performed (step S31).

When the delay time in the LANIF 21d1 is shorter than that in the LANIF 21d3, in the LANIF 21d1, the AT table is searched again (step S32 and the set/reset state of the flag in the desired entry for the source station address in the AT table is determined (step S33) while the LANIF 21d3 is in the standby state (step S32). In this case, since the flag T1 is set and the flag in the desired entry for the destination station address is reset (steps S35 and S36), a message 95 corresponding to the message 91 in the received broadcast message 92 is transmitted to the LAN 10d1 (step S42).

The message 95 transmitted from the LANIF 21d1 to the LAN 10d1 is received by the ST 11d1 and is also received by the LANIF 21d3 in the standby state. Therefore, the LANIF 21d3 starts the message reception process in accordance with the flow charts in FIGS. 8A and 8B.

Since the flag T1 is set in the desired entry for the source station address in the AT table (steps S2 and S3), the flag to be set in the desired entry of the AT table is changed from the flag T1 to the flag T3, and the timer value is initialized (step S4). Note that the source bridge port address is not changed. The received message 95 is aborted (step S17).

In this case, when the standby state for the message 92 in the LANIF 21d3 is canceled, the AT table is searched to determine the set/reset state of the flag in the desired entry for the source station address (steps S32 and S33). Upon reception of the message 95 transmitted from the LANIF 21d1 to the LAN 10d1, since the flag to be set is changed from the flag T1 to the flag T3, the timer value is initialized (step S38), and the received message 95 is aborted (step S43).

According to this embodiment, since one of the duplexed interfaces is operated in a normal state, no error caused by duplexing occurs. For example, when the LANIF 21d1 fails, the LANIF 21d3 can be operated as in the LANIF 21d1. In this case, the message transmission and reception can be continued even if a trouble such as a failure occurs. In addition, the number of interfaces to be multiplexed is not limited to two, but can be three or more. Further, WAN interfaces may be multiplexed.

Message transmission and reception between the LANs through a WAN has been exemplified. However, the present invention is not limited to a network system such as a ring, bus, or star network system, but can be applied to a mesh network system.

According to the present invention, information representing connection relationships between stations are automatically registered by each interface in each LAN connector unit on the basis of a message received from a LAN, a message received from a WAN, a message received from an internal network, and a difference between arrival times of the same message. In addition, each interface itself can determine whether it is used as an interface on an optimal transmission line. A transmission line can be automatically selected by detouring a failure interval on the WAN or in consideration of a load balance on the WAN. In addition, interfaces can be multiplexed, and therefore a network system which can eliminate a failure can be arranged. Furthermore, since the optimal transmission line can be determined by the desired determination process as described above, the system configuration can be made simpler than the conventional system in which an optimal transmission line is determined by an operation monitoring unit.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A network system comprising:
   a plurality of first networks, each having at least one station;
   a plurality of second networks;
   a plurality of interfaces, each of the interfaces being coupled to one of the first and second networks; and
   a plurality of internal networks, each of the interfaces being coupled to one of the internal networks, and wherein each of the interfaces includes:
   a table for registering a station address and a corresponding interface address with respect to a source station and a destination station, and set/reset states of a plurality of flags;
   control-means for, when a first message from the source station is received by the interface itself through one of the first networks, altering said table to register a station address of the source station and an interface address of the interface itself, causing said table to set a first flag, and transmitting the first message to one internal network coupled to the interface itself by a broadcast,
   wherein the control means, when a message from the one internal network is a message transmitted by the interface itself, altering said table to set a second flag and aborts the message from, the one internal network, the control means, when a message from the one internal network is a first message from the source station, altering said table to register the station address of the source station and the interface address of another interface which transmits the first message to the internal network, altering (the) said table to set a third flag, and transmits the first message to one of the first and second networks, and the control means, when a message from one of the second networks is received by the interface itself and when the third flag is to be set into the table, aborts the message from the one second network.

2. The system according to claim 1, wherein each of the first networks includes a local area network.

3. The system according to claim 1, wherein each of the second networks includes a wide area network.

4. The system according to claim 1, wherein each of the interfaces further includes memory means for storing a message to be received.

5. The system according to claim 1, wherein when the first flag is to be set into the table of a receiving interface which a message is received, with respect to the station address of the source station included in the received message, and when the interface address of a source interface included in the received message is different from the interface address registered into the table of the receiving interface, the receiving interface aborts the received message.

6. The system according to claim 1, wherein after the first flag is set into the table of the interface, the control means determines whether or not the one interface itself is one of multiplexed interfaces coupled to the same first network.

7. A method for determining a transmission line for a message transmission and reception in a network system, the method comprising the steps of:

receiving a message by an interface;

registering a station address of a source station and interface address of the interface, setting a first flag, and transmitting the received message to an internal network by broadcast, when the received message is a first message source station through a local area network;

setting a second flag and aborting the received message when the received message is a message transmitted by the interface;

registering the station address of the source station and the interface address of the interface, setting a third flag, and transmitting the received message to one of the local area network and a wide area network, when the received message is a first message from an internal network; and aborting the received message when the received message is a message from the wide area network and when the third flag is to be set.

8. The method according to claim 7, wherein when the first flag is to be set with respect to the station address of the source station included in a message to be received, and when the interface address of a source interface included in the received message is different from the interface address to be registered, the received message is aborted.

9. An apparatus for coupling a plurality of local area networks to a plurality of wide area networks, each of the local area networks having at least one station, the apparatus comprising:

a plurality of interfaces for transmitting and receiving a message; and an internal network for connecting the interfaces one another, and wherein each of the interfaces includes register means for registering a station address and a corresponding interface address with respect to a source and a destination, and set/reset states of a plurality of flags; and control means for altering the register means to register a station address of a source station and an interface address of the interface itself, altering the register means to set a first flag, and transmitting the message to the internal network by a broadcast, when a message from the source station through one of the local area networks is a first message, wherein the control means alters the register means to set a second flag and aborts a message from the internal network when the message from the internal network is a message transmitted from the interface itself, the control means alters the register means to register the station address of the source station and the interface address of another interface which transmits the first message to the internal network, causes the register means to set a third flag and transmits the message from the internal network to one of the local area networks and the wide area networks, when a message from the internal network is a first message from the source station, and the control means aborts the message from the wide area networks when the message from the wide area networks is received and the third flag is to be set.

* * * * *